US012488287B2

(12) United States Patent
Yates et al.

(10) Patent No.: US 12,488,287 B2
(45) Date of Patent: Dec. 2, 2025

(54) RICH MEDIA PRESENTATION OF RECOMMENDATIONS IN GENERATIVE MEDIA

(71) Applicant: Dropbox, Inc., San Francisco, CA (US)

(72) Inventors: Andrew Donald Yates, San Francisco, CA (US); Daniel Bosnic Hill, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/823,415

(22) Filed: Sep. 3, 2024

(65) Prior Publication Data

US 2025/0094870 A1    Mar. 20, 2025

Related U.S. Application Data

(60) Provisional application No. 63/538,908, filed on Sep. 18, 2023.

(51) Int. Cl.
*G06N 20/00* (2019.01)
*G06Q 30/0241* (2023.01)

(52) U.S. Cl.
CPC ......... *G06N 20/00* (2019.01); *G06Q 30/0241* (2013.01)

(58) Field of Classification Search
CPC .......................... G06N 20/20; G06Q 30/0241
USPC .......................................................... 706/12
See application file for complete search history.

(56) References Cited

U.S. PATENT DOCUMENTS

2024/0005386 A1\*   1/2024   Thurairatnam .... G06Q 20/4014
2024/0354503 A1\*  10/2024   Baruch ................. G06F 16/345

OTHER PUBLICATIONS

Cao, et al., "Reinforcement Learning for Generative AI: A Survey", arXiv:2308.14328v2 [cs.LG] Aug. 29, 2023 (Year: 2023).\*
Van de Ven, et al., "Generative replay with feedback connections as a general strategy for continual learning", arXiv: 1809.10635v2 [cs.LG] Apr. 17, 2019 (Year: 2019).\*

\* cited by examiner

*Primary Examiner* — Tsu-Chang Lee
(74) *Attorney, Agent, or Firm* — Keller Preece PLLC

(57) ABSTRACT

Methods and systems provide for rich media presentation of recommendations in generative media. In one embodiment, the system presents, via a trained generative AI, a set of media content to a user in a communication session within a platform, the media content including a number of sorted recommended items; monitors and quantifies one or more user responses from the user to the presented media content and one or more associated generative responses from the trained generative AI; based on the monitoring and quantifying, detects one or more mentions of the user to one of the plurality of sorted recommended items; generates, from the one or more detected mentions, one or more labeled training examples; and further trains the trained generative AI based on the one or more labeled training examples to improve the presentation of the media content in future communication sessions.

19 Claims, 5 Drawing Sheets

FIG. 3

RICH MEDIA PRESENTATION OF RECOMMENDATIONS IN GENERATIVE MEDIA

CROSS-REFERENCE TO RELATED APPLICATIONS

This application claims the benefit of priority to U.S. Provisional Application No. 63/538,908, filed on Sep. 18, 2023, which is hereby incorporated by reference in its entirety.

FIELD OF INVENTION

Various embodiments relate generally to content generation, and more particularly, to systems and methods for providing rich media presentation of recommendations in generative media.

SUMMARY

The appended claims may serve as a summary of this application.

BRIEF DESCRIPTION OF THE DRAWINGS

The present invention relates generally to content generation, and more particularly, to systems and methods for providing rich media presentation of recommendations in generative media.

The present disclosure will become better understood from the detailed description and the drawings, wherein:

FIG. 3 is a diagram illustrating one example embodiment of providing rich media presentation of recommendations in generative media.

DETAILED DESCRIPTION

Figure 1A:
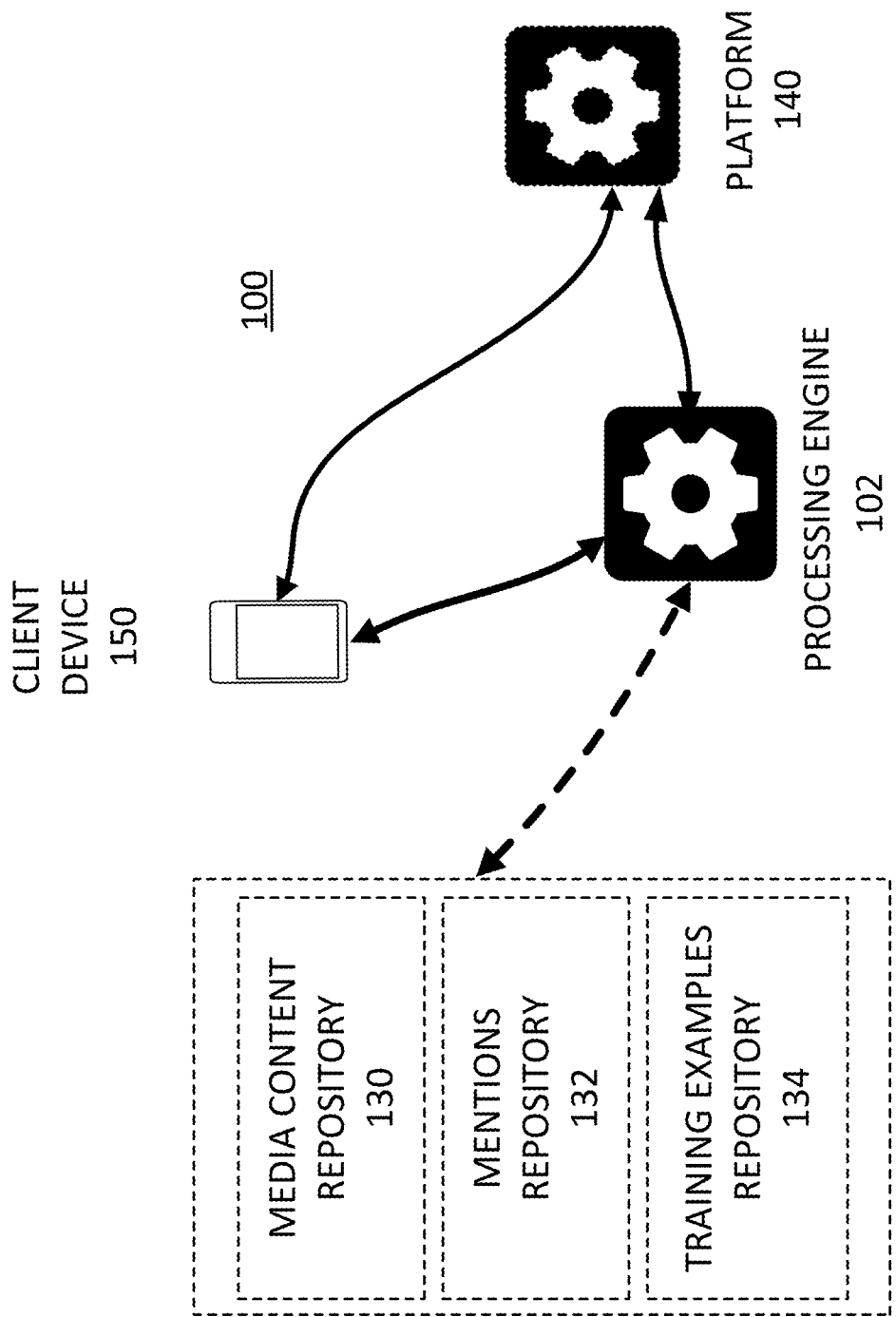
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

In online platforms and recommendation systems, the presentation of content to users has long been a central concern. Presenting recommendations effectively, be it for products, services, or media content, plays a pivotal role in user engagement and the potential for desired outcomes. In recent years, there has been a notable shift towards harnessing the capabilities of artificial intelligence (hereinafter "AI") systems to enhance content presentation. These AI-driven systems leverage vast datasets and sophisticated algorithms to offer personalized recommendations to users, striving to create engaging and tailored experiences.

However, the current state of the art is not without its limitations. Existing recommendation systems often fall short in dynamically adapting their presentation of content based on real-time user interactions and preferences. These systems frequently struggle to strike a balance between presenting relevant content and respecting user privacy concerns. Furthermore, their ability to efficiently refine recommendations based on user feedback and commercial outcomes is often constrained. In many cases, users are presented with recommendations that may not align with their current intent or preferences, resulting in suboptimal engagement and reduced likelihood of desired outcomes.

Moreover, tracking and analyzing the effectiveness of content presentation strategies within such systems has been a complex and challenging endeavor, often lacking robust solutions for dynamically refining content presentation. There remains a need for more efficient methods and systems that can adapt content presentation in real time, leveraging both user interactions and generative AI capabilities to improve engagement and increase the likelihood of desired outcomes. These shortcomings in the current state of the art create an opportunity for innovations that can address these challenges and revolutionize the way recommendations are presented to users within online platforms.

In one embodiment, the system presents, via a trained generative AI, a set of media content to a user in a communication session within a platform, the media content including a number of sorted recommended items; monitors and quantifies one or more user responses from the user to the presented media content and one or more associated generative responses from the trained generative AI; based on the monitoring and quantifying, detects one or more mentions of the user to one of the plurality of sorted recommended items; generates, from the one or more detected mentions, one or more labeled training examples; and further trains the trained generative AI based on the one or more labeled training examples to improve the presentation of the media content in future communication sessions.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150, and a platform 140 are connected to a processing engine 102. The processing engine 102 is optionally connected to one or more repositories and/or databases. Such repositories and/or databases may include, for example, a media content repository 130, a mentions repository 132, and a training examples repository 134. One or more of such repositories may be combined or split into multiple repositories. The client device 150 in this environment may be a computer, and the platform 140 and processing engine 102 may be, in whole or in part, applications or software hosted on a computer or multiple computers which are communicatively coupled via remote server or locally.

The exemplary environment 100 is illustrated with only one client device, one processing engine, and one platform, though in practice there may be more or fewer additional client devices, processing engines, and/or platforms. In some embodiments, the client device, processing engine, and/or platform may be part of the same computer or device.

In an embodiment, the processing engine 102 may perform the method 200 (FIG. 2) or other method herein and, as a result, provide for rich media presentation of recommendations in generative media. In some embodiments, this may be accomplished via communication with the client device, additional client device(s), processing engine 102, platform 140, and/or other device(s) over a network between the device(s) and an application server or some other network server. In some embodiments, one or both of the processing engine 102 and platform 140 may be an application, browser extension, or other piece of software hosted on a computer or similar device, or in itself a computer or similar device configured to host an application, browser extension, or other piece of software to perform some of the methods and embodiments herein.

In some embodiments, the processing engine 102 performs processing tasks partially or entirely on the client device 102 in a manner that is local to the device and relies on the device's local processor and capabilities. In some embodiments, the processing engine 102 may perform processing tasks in a manner such that some specific processing tasks are performed locally, such as, e.g., visual AI processing tasks, while other processing tasks are performed remotely via one or more connected servers. In yet other embodiments, the processing engine 102 may processing tasks entirely remotely.

In some embodiments, client device 150 may be a device with a display configured to present information to a user of the device. In some embodiments, the client device 150 presents information in the form of a user interface (UI) with UI elements or components. In some embodiments, the client device 150 sends and receives signals and/or information to the processing engine 102 pertaining to the platform. In some embodiments, client device 150 is a computer device capable of hosting and executing one or more applications or other programs capable of sending and/or receiving information. In some embodiments, the client device 150 may be a computer desktop or laptop, mobile phone, virtual assistant, virtual reality or augmented reality device, wearable, or any other suitable device capable of sending and receiving information. In some embodiments, the processing engine 102 and/or platform 140 may be hosted in whole or in part as an application or web service executed on the client device 150. In some embodiments, one or more of the platform 140, processing engine 102, and client device 150 may be the same device. In some embodiments, the platform 140 and/or the client device 150 are associated with one or more particular user accounts.

In some embodiments, optional repositories function to store and/or maintain, respectively, media content generated by a trained generative AI, mentions of sorted recommended items by a user, and labeled training examples generated from the mentions. The optional repositories may also store and/or maintain any other suitable information for the processing engine 102 to perform elements of the methods and systems herein pertaining to the platform. In some embodiments, the optional database(s) can be queried by one or more components of system 100 (e.g., by the processing engine 102), and specific stored data in the database(s) can be retrieved.

The platform is a platform configured to provide rich media presentation of recommendations in generative media. In some embodiments, the platform may be hosted within an application that can be executed on the user's client device, such as a smartphone application.

Figure 1B:
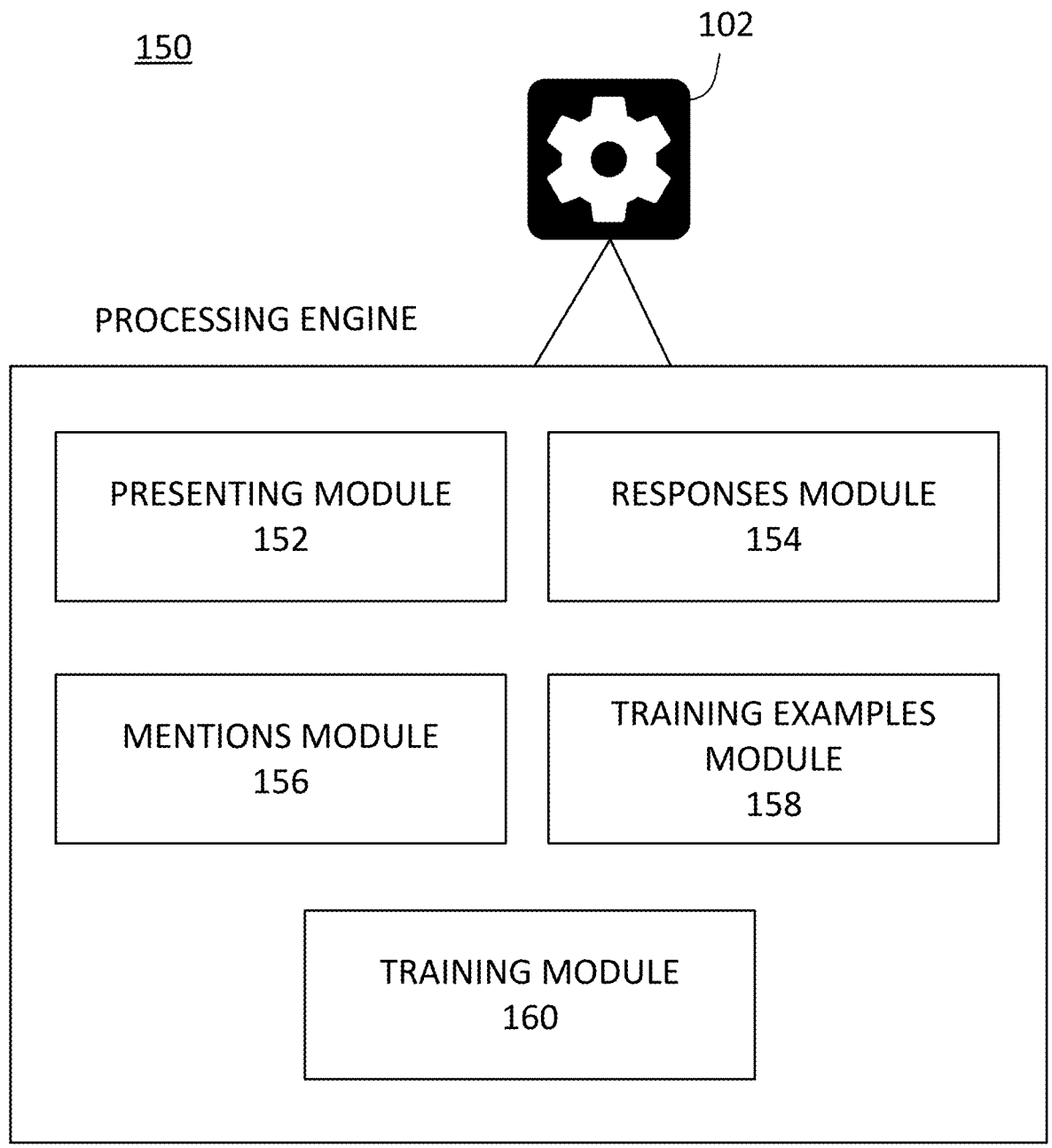
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Presenting module 152 functions to present, via a trained generative AI, a set of media content to a user in a communication session within a platform, the media content including a number of sorted recommended items.

Responses module 154 functions to monitor and quantify one or more user responses from the user to the presented media content and one or more associated generative responses from the trained generative AI.

Mentions module 156 functions to detect, based on the monitoring and quantifying, one or more mentions of the user to one of the plurality of sorted recommended items.

Training examples module 158 functions to generate, from the one or more detected mentions, one or more labeled training examples.

Training module 160 functions to further trains the trained generative AI based on the one or more labeled training examples to improve the presentation of the media content in future communication sessions.

The functionality of the above modules will be described in further detail with respect to the exemplary method of FIG. 2A below.

Figure 2:
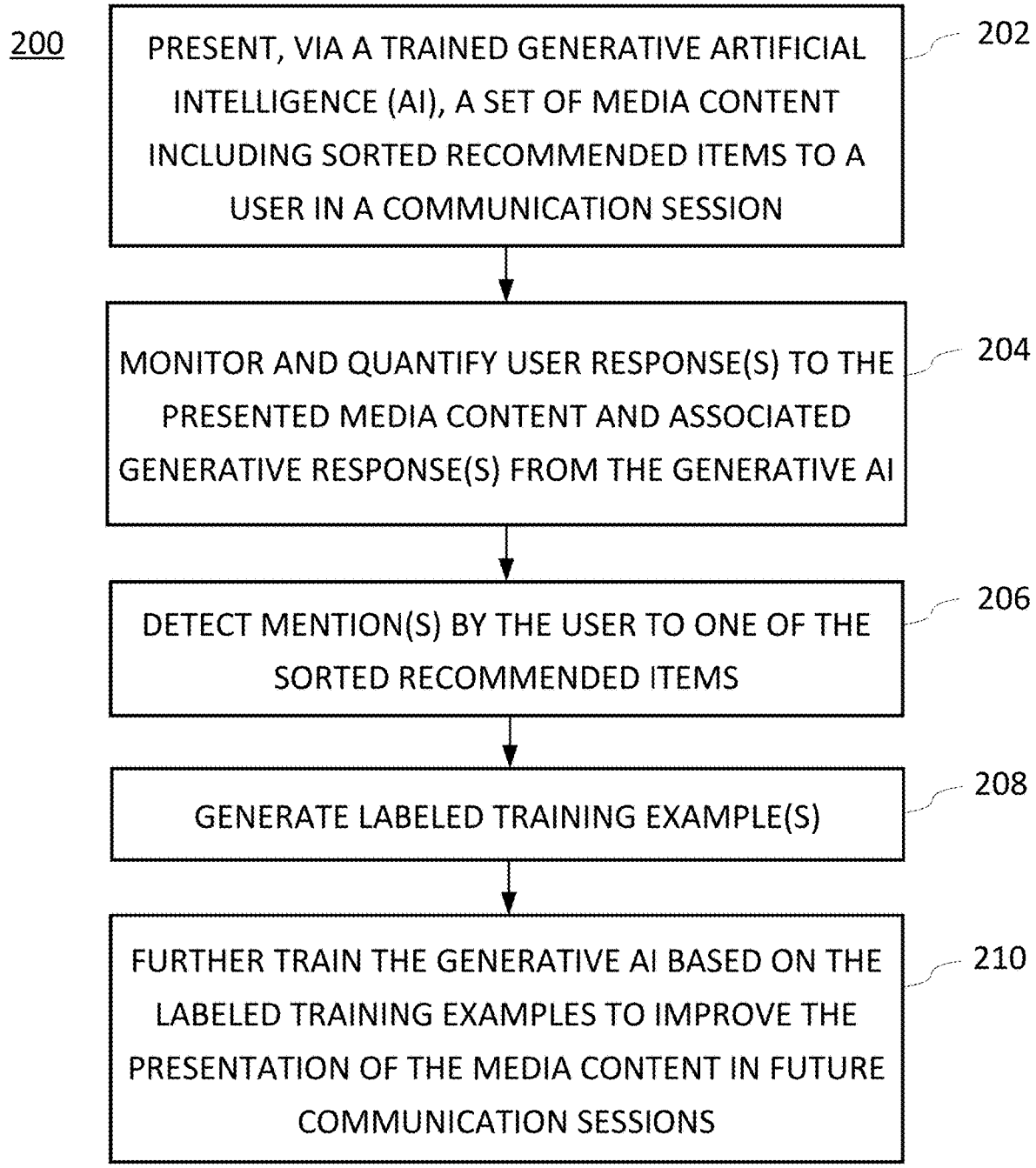
FIG. 2 is a flow chart illustrating an exemplary method that may be performed in some embodiments.

FIG. 2 is a flow chart illustrating an exemplary method that may be performed in some embodiments.

At step 202, the system presents, via a trained generative AI, a set of media content to a user in a communication session within a platform, the media content including a number of sorted recommended items. This presentation is facilitated through the utilization of a trained generative AI system, which brings a dynamic and personalized element to the user experience. In some embodiments, the generative AI system has been trained to curate a set of media content, which includes a set of sorted recommended items. In various embodiments, these recommended items are prioritized and organized based on their relevance to, e.g., the user's preferences, historical interactions, and/or the specific context of the ongoing communication session.

In some embodiments, the communication session is conducted within an online platform facilitating user interactions and media content presentation. Within this online platform, users have the opportunity to interact with recommended media content, such as products, services, or information. The system utilizes its trained generative AI to present and refine these recommendations based on user responses and interactions. By conducting these communication sessions within an online platform, the system can take advantage of the platform's features and capabilities. This can include seamless integration with the platform's user interface, access to user profiles and preferences, and the ability to track user interactions and feedback. All of these elements contribute to the system's ability to dynamically refine the presentation of recommendations to users.

In some embodiments, the presentation process begins after the user has engaged with the platform to provide information about the user's needs or requests. For example, the user may initiate a communication session to communicate with a chatbot that is deployed via a generative AI system to communicate with the user, including sending replies and responses to a user's messages, queries, and requests.

Within this session, as a result of the user's messages, queries, and requests, which my collectively be referred to as "prompts" from the user, the generative AI system steps in to provide a curated selection of media content. In various embodiments, this content can encompass various forms, such as, e.g., text, images, audio, and video, allowing for a rich and engaging user experience.

In some embodiments, each of the recommended items is accompanied with annotations, which serve to provide an explanation of the user of why the item has been recommended, and what unique benefits it may offer to the user based on the user's specific preferences, requests, context, and more.

In some embodiments, the generative AI leverages its training to not only present relevant content, but also to ensure that the recommended items are strategically sorted. In some embodiments, the system takes into account recommendation magnitude scores that reflect their likelihood of resonating with the user. In some embodiments, these scores can assist in determining the order and prominence of recommended items within the set of media content presented to the user during a communication session within the platform. In some embodiments, recommendation magnitude scores are quantitative assessments assigned to each recommended item. They reflect the strength or relevance of each recommendation to the user's specific context, preferences, and needs. In some embodiments, these scores are calculated using algorithms that analyze various factors, such as, e.g., user behavior, historical data, item attributes, and/or user feedback. In some embodiments, items with higher recommendation magnitude scores are given precedence and are more prominently featured in the media content presentation. This prioritization ensures that the user is exposed to items that are not only relevant but also more likely to align with their interests, increasing the chances of user engagement and desired outcomes.

In some embodiments, the recommendation magnitude scores are influenced by economic considerations, ensuring equitable distribution of sales across multiple sellers. Specifically, the system considers economic factors to ensure an equitable distribution of sales opportunities across multiple sellers. This means that the recommendation magnitude scores are influenced by the system's goal to provide fair and balanced exposure to different sellers or providers within the platform. By factoring in economic considerations, the system can help prevent any one seller or provider from dominating the recommendations, creating a more level playing field for all participants. This approach promotes healthy competition and ensures that users are presented with a diverse range of options, benefiting both users and sellers.

In some embodiments, the generative AI acts as an intelligent curator, tailoring the presentation of media content to align with the user's preferences and the ongoing conversation or context within the platform. This level of personalization enhances user engagement and increases the chances of the user finding the presented content valuable. The generative AI's capacity to generate media content dynamically based on real-time interactions and preferences sets this method apart from traditional static content presentation approaches.

Furthermore, in some embodiments, the presentation is adaptable and responsive to user actions and preferences during the communication session. In some embodiments, the media content presentation is further refined by factoring in user feedback obtained from user responses. As the session progresses and the user interacts with the presented media content, the generative AI system continuously refines its recommendations, aiming to improve the user's experience. This iterative refinement process ensures that the content presented aligns with the user's evolving intent and interests.

In some embodiments, the generative AI system used for generating the chatbot's messages is a Large Language Model (hereinafter "LLM"). The LLM processes user prompts by analyzing the conversational context, understanding the user's preferences, and leveraging its extensive language knowledge to craft a coherent and contextually fitting response. In various embodiments, it does so by employing a variety of natural language processing techniques, such as, e.g., language modeling, tokenization, and/or context awareness.

In some embodiments, the LLM-based generative AI acts as a virtual conversational partner that can engage in dialogue with users, understand their inquiries, and generate meaningful responses. It does not merely provide pre-programmed responses, but rather has the capacity to generate dynamic and personalized answers based on, e.g., the unique conversational context and user preferences. This capability sets it apart from traditional rule-based systems, which lack the flexibility and adaptability to provide truly interactive and contextually rich conversations. By harnessing the power of LLMs, the generative AI system enhances the conversational experience within the platform, making interactions more natural, informative, and tailored to the individual user's needs. As a result of the conversations, the LLM can be configured to provide the presentation of the media content to the user.

In various embodiments, the input submissions provided by the user can encompass various forms of user-generated content, including, e.g., text messages, voice recordings, or any other input methods supported by the conversational interface. In some embodiments, these input submissions carry the conversational context, which includes the ongoing dialogue between the user and the generative AI system. This context is essential for the generative AI system to understand the user's current needs, preferences, and objectives.

In some embodiments, these input submissions provide information on the user's preferences, which can play a significant role in shaping the recommendations and responses generated by the AI system. In various embodiments, these preferences could range from specific requirements, such as, for example, pet-friendly accommodations in a travel context, to more general preferences, such as a preference for budget-friendly options or a preference for nearby locations. These user preferences are vital for tailoring the AI's recommendations to align with the user's individual tastes and needs. By incorporating the conversational context and user preferences, the generative AI system gains valuable insights into the user's objectives, enabling it to craft personalized recommendations and responses that enhance the user's experience within the platform.

In some embodiments, the system receives one or more pieces of contextual information from the conversation, which adds a layer of adaptability and responsiveness to the responses generated by the generative AI system. In various embodiments, this contextual information can include, for example, details such as the time of day, the geographic location of the user, and/or details on the specific niches, interests, or qualifications the user would like the system to consider. Incorporating this contextual information ensures that the generated content is not only user-specific, but also contextually relevant, increasing the likelihood of capturing the user's interest.

In some embodiments, central to this presentation is the incorporation of media content, which adds depth and richness to the recommendations. Rather than providing merely a textual list, the generative AI system can leverage various forms of media, such as, for example, text, images, audio clips, video snippets, interactive elements, or a combination thereof, to represent at least a portion of the search result items. This multimedia approach transforms the recommendations into visually appealing and informative content that captures the user's attention.

For example, if a search query requested by the user on the platform was related to vacation rentals, the presentation may include high-resolution images of the suggested properties, showcasing their aesthetics and features. Additionally, it could include short video clips that offer virtual tours, giving the user a real sense of what to expect. This multimedia integration not only makes the recommendations more enticing but also aids in the user's decision-making process.

In some embodiments, the presentation is seamlessly integrated within the platform's user interface, ensuring a cohesive and user-friendly experience. In some embodiments, users do not need to navigate to separate pages or interfaces to view the recommendations; instead, they are presented within the existing context of their interaction.

In some embodiments, the system detects whether one or more paid promotions have materially affected the sorting or content of the presented recommendations, and then presents a disclosure of the paid promotions that materially affected the sorting or content of the presented recommendations. In some use cases, paid promotions can significantly influence the sorting and content of recommendations. Thus, the system can be configured for the detection and disclosure of such paid promotions to ensure users are aware of any external influences on their recommendations. In some embodiments, the system detects whether one or more paid promotions have had a substantial impact on the sorting or content of the recommendations. In some embodiments, this detection process involves analyzing search results and/or annotations, as well as monitoring any external factors, such as sponsored listings or paid advertising, that might have influenced the recommendations.

In some embodiments, once detected, the system assesses whether these paid promotions have materially affected the recommendations. Material impact implies that the recommendations would have been substantially different without these paid promotions. This assessment helps to identify cases where external interests significantly sway the user experience.

In some embodiments, if the system determines that paid promotions have indeed had a material impact on the recommendations, it initiates a disclosure process. This disclosure is presented to the user, making them aware of the external influence on their personalized recommendations. It may include clear indications, labels, or explanations about which recommendations were influenced by paid promotions.

At step 204, the system monitors and quantifies one or more user responses from the user to the presented media content and one or more associated generative responses from the trained generative AI. In some embodiments, as the user engages with the presented media content, their responses, interactions, and behaviors are meticulously tracked and monitored. This encompasses a wide range of user actions such as, e.g., clicks, views, likes, shares, or textual or vocal responses. In some embodiments, the system is configured to capture a comprehensive understanding of how the user engages with the content and how they perceive and react to it.

Simultaneously, the system also monitors and quantifies the generative AI's responses within the communication session. In various embodiments, this includes examining, e.g., the generative AI's generated content, recommendations, responses to user queries, and/or overall conversational interactions. By monitoring both user and AI responses in tandem, the system can create a complete picture of the dynamics at play during the session.

In some embodiments, quantification includes assigning numerical values or scores to various aspects of these responses. For example, user responses can be quantified in terms of engagement levels, indicating how deeply the user interacts with specific content. Additionally, in some embodiments, sentiment analysis can be employed to gauge user reactions, distinguishing between positive and negative sentiments in response to content.

In some embodiments, on the generative AI side, the responses are quantified to assess their quality and relevance. In some embodiments, this quantification can include evaluating, e.g., the accuracy of generated responses, the alignment with user intent, and the impact on user engagement and desired outcomes.

At step 206, the system detects, based on the monitoring and quantifying, one or more mentions of the user to one of the plurality of sorted recommended items. As the user engages with the presented media content, their interactions are closely monitored and quantified, as described earlier. Within these interactions, the system actively looks for instances where the user mentions or references specific recommended items. In various embodiments, these mentions can take various forms, including, e.g., textual mentions, vocal mentions, or actions such as clicking on a recommended item.

In some embodiments, the detection process involves the use of natural language processing (hereinafter "NLP") and/or pattern recognition techniques to identify and extract mentions from the user's responses. In some embodiments, for textual mentions, NLP algorithms analyze the user's written or typed responses to identify keywords or phrases that correspond to recommended items. Similarly, for vocal mentions, speech recognition technology may be employed to transcribe spoken words and detect references to recommended items.

In some embodiments, these mentions can encompass a wide range of user interactions. For example, a user might express interest in a specific recommended product, inquire about its features, request more information, or even indicate a desire to purchase it. The system's ability to detect these mentions provides valuable insights into which recommended items have captured the user's attention and triggered a response.

At step 208, the system generates, from the one or more detected mentions, one or more labeled training examples. In some embodiments, these training examples play a crucial role in further training and refining the generative AI model, improving its ability to present media content effectively and tailor it to individual user preferences.

In some embodiments, to create these labeled training examples, the system collects and compiles the instances where the user has mentioned or interacted with recommended items. In some embodiments, each labeled training example consists of at least two key components, a user mention and a generative AI response to the mention. In various embodiments, the user mention can take various forms, such as, e.g., textual references in chat messages, spoken mentions in voice interactions, or actions like clicking on a recommended product. In some embodiments, the generative AI response to the mention includes the system's reply or action triggered by the user's mention. For example, if a user asks for more information about a recommended book, the generative AI's response may include a brief book description.

These training examples serve as valuable data points for training the generative AI model to better understand user interactions and preferences. By pairing user mentions with generative AI responses, the model learns how to respond effectively to user queries, requests, or expressions of interest related to recommended items. In some embodiments, the labeling of these training examples helps the system distinguish between successful and unsuccessful interactions. For example, a successful interaction might result in the user making a purchase or expressing satisfaction with the response, while an unsuccessful one might involve user dissatisfaction or a lack of follow-through on the user's part.

In some embodiments, the generative AI model can then use these labeled training examples to improve its responses and recommendations in future communication sessions. By learning from past user interactions and mentions, the model becomes better equipped to provide relevant, engaging, and personalized content presentations. This iterative process of generating labeled training examples and training the AI model contributes to the dynamic refinement of media content presentations in the platform.

In some embodiments, the generated training examples include user interactions that lead to commercial outcomes. This means that the training data used to refine the generative AI includes instances where users engage with the presented media content and subsequently take actions that have a direct economic impact within the platform. In various embodiments, user interactions leading to commercial outcomes can encompass a wide range of activities, such as, for example, users clicking on recommended items, making purchases, booking services, or engaging in transactions. These interactions are particularly valuable as they directly contribute to the platform's revenue and reflect successful user engagement. By including such interactions in the training examples, the generative AI is trained to understand and prioritize content and responses that are more likely to lead to commercial success.

In some embodiments, the system utilizes an attribution model to attribute user actions to media content mentions. In some embodiments, this can be performed for the purpose of generated the labeled training examples. In various embodiments, the utilization of an attribution model allows the system to connect user actions, such as, e.g., clicks, views, or interactions, with the specific pieces of media content that prompted those actions. By doing so, the system gains an understanding of which media content items are the most influential or effective in driving user engagement and desired outcomes. For example, if a user clicks on a recommended product within a list of items, the attribution model helps identify that this specific product mention was the trigger for the click. This information is valuable for refining future media content presentation. The system can then prioritize or fine-tune the presentation of similar media content items based on their attributed impact on user actions.

At step 210, the system further trains the trained generative AI based on the one or more labeled training examples to improve the presentation of the media content in future communication sessions. This additional training aims to enhance the AI's capabilities and refine its performance when presenting media content to users in future communication sessions within the platform. In some embodiments, the system utilizes the labeled training examples created from real user interactions. These examples contain valuable insights into how users engage with media content and how the generative AI responds to their mentions and requests.

In some embodiments, the generative AI model undergoes a fine-tuning process based on the labeled training examples. This fine-tuning aims to make the AI more responsive to user preferences, intent, and behavior. It involves adjusting the model's parameters and learning algorithms to align more closely with desired outcomes. In some embodiments, fine-tuning the generative AI involves a process of adjusting its internal parameters and learning algorithms to better align with the desired outcomes and user preferences. In various embodiments, this fine-tuning can be achieved through various techniques, including, e.g., supervised learning and reinforcement learning. In some embodiments, during supervised learning, the AI model is provided with the labeled training examples generated from real user interactions. It then refines its responses based on these examples, learning to generate more contextually relevant and effective media content presentations. In some embodiments, reinforcement learning can alternatively or additionally play a role in fine-tuning the AI. In some embodiments, the generative AI receives feedback from the platform regarding the success of its generated responses. In various embodiments, this feedback can be in the form of, e.g., user interactions, conversions, and/or other engagement metrics. In some embodiments, the AI model then adjusts its behavior to maximize the likelihood of desirable outcomes, such as encouraging users to take specific actions like making a purchase or booking.

In some embodiments, the fine-tuning is an ongoing and dynamic process, ensuring that the generative AI remains adaptable and responsive to changing user behaviors and preferences. In various embodiments, the generative AI continually, periodically, or semi-periodically refines its presentation skills over time, based on the insights gained from real-world user interactions, ultimately delivering an improved and personalized media content experience for platform users.

In some embodiments, by training on these labeled examples, the generative AI becomes more adept at tailoring media content presentations to individual users. It learns to recognize patterns of user behavior and preferences, enabling it to present recommendations that are increasingly likely to engage users positively.

In some embodiments, the goal of the generative AI system in this context is to optimize the presentation of media content. This includes improving the relevance, appeal, and effectiveness of recommended items based on user feedback and interactions. The AI becomes more skilled at selecting and arranging content, considering factors like user history, preferences, and session context, in order to achieve one or more engagement objectives. In some embodiments, this engagement objective may be, for example, engaging the user to ultimately complete a sale within the platform, or engage with content in some other way. In some embodiments, the trained generative AI model is optimized to prioritize presenting media content that is likely to result in desirable outcomes. In various embodiments, the desirable outcomes or engagement objectives may include one or more of: user satisfaction, engagement, conversions (such as purchases or bookings), and other user actions that indicate a positive interaction with the presented media content.

In some embodiments, the process of further training is iterative. As the AI model gains more experience through ongoing interactions and collects additional labeled training examples, it continues to refine its understanding and presentation skills. This ensures that the system adapts to evolving user preferences and behavior over time.

In some embodiments, the system assesses the efficiency of the generative AI's responses based on a quantitative analysis of achieved desirable outcomes. This means that the effectiveness of the AI's recommendations and responses is evaluated based on measurable criteria related to user interactions and the achievement of specific goals or outcomes. In some embodiments, the assessment process involves quantifying various aspects of the AI's performance, such as, for example, the impact of its recommendations on user behavior, conversion rates, user satisfaction, or other key performance indicators. It aims to provide a clear and data-driven understanding of how well the generative AI is meeting the desired objectives within the platform. By conducting a quantitative analysis, the method allows for objective evaluation and continuous improvement of the generative AI's responses.

In some embodiments, the system assesses the efficiency of the generative AI's responses based on user feedback. This means that the effectiveness and quality of the AI's recommendations and responses are evaluated by collecting and analyzing feedback from the users of the platform. User feedback plays a crucial role in understanding how well the generative AI is performing in meeting user expectations and requirements. In various embodiments, users may provide feedback on various aspects, such as, for example, the relevance of recommendations, the clarity of responses, user satisfaction, or any issues encountered during their interactions with the AI. By actively soliciting and considering user feedback, the method aims to ensure that the generative AI's responses align with user preferences and needs. This user-centric approach helps in identifying areas where improvements or refinements may be necessary to enhance the user experience within the platform.

In some embodiments, the system adjusts the presentation of media content based on user interactions within the communication session. In some embodiments, this adjustment is a dynamic response to how users engage with the presented content during their interactions within the platform. In some embodiments, the method continuously evaluates user interactions in real-time. It monitors how users respond to the media content, including whether they engage with it, click on recommended items, provide feedback, or take other relevant actions. This ongoing assessment enables the system to adapt and tailor the presentation of media content to better align with the evolving preferences and needs of the user.

In some embodiments, the system employs data from both successful and unsuccessful communication sessions to enhance future media content presentation. This means that the system learns from a wide range of user interactions, regardless of whether they resulted in favorable outcomes or not. In some embodiments, the inclusion of data from unsuccessful sessions allows the system to identify what doesn't work or what might lead to less desirable outcomes. By learning from these less successful interactions, the system can avoid repeating the same mistakes and continuously refine its presentation strategies. In some embodiments, successful communication sessions provide valuable insights into what resonates with users and leads to positive outcomes, such as conversions or user satisfaction. By analyzing these successful sessions, the system can identify patterns and strategies that can be applied more broadly to improve the overall effectiveness of media content presentation.

In some embodiments, the system generates, from the detected mentions, user engagement signals for refining the generative AI model. When a user engages with the presented media content and mentions specific items, this action generates valuable user engagement signals. These signals are derived from the user's interactions and provide important feedback on how the generative AI model is performing in response to user-initiated discussions about recommended items. In some embodiments, the process involves collecting and analyzing these user engagement signals, which can include information about which recommended items users are interested in, how they express their preferences, and their overall satisfaction with the generative AI's responses during the communication session. In some embodiments, these user engagement signals serve as a valuable source of data for refining the generative AI model. By understanding how users respond to and interact with recommended items, the system can adapt and improve its responses and recommendations in future communication sessions. This iterative feedback loop helps enhance the system's ability to tailor media content presentations to each user's preferences and needs more effectively.

In some embodiments, the system evaluates the effectiveness of generative AI responses based on inferred user outcomes associated with media content interactions. In this context, effectiveness is determined by assessing the outcomes associated with user interactions with the presented media content. In some embodiments, the system gathers data on user outcomes, which can include actions taken by users in response to the recommended items, such as, for example, making a purchase, expressing interest, or requesting more information. These actions serve as indicators of the generative AI's ability to guide users towards desirable outcomes within the communication session.

In some embodiments, the evaluation process involves inferring user outcomes from their interactions with the media content. For example, if a user expresses interest in a recommended product and proceeds to make a purchase, this would be considered a positive outcome. Conversely, if a user expresses dissatisfaction or takes no action, it may be indicative of an ineffective response. By assessing these inferred user outcomes, the system gains insights into the performance of the generative AI responses and its ability to influence user behavior positively.

In some embodiments, the training of the trained generative AI includes enhancing the AI's ability to generate responses that align with user intent, thereby optimizing user engagement and desired outcomes. In some embodiments, the training process focuses on improving the generative AI's ability to interpret and understand user intent. In some embodiments, this involves fine-tuning the AI model to better comprehend the nuances of user queries, requests, and preferences expressed during communication sessions. By aligning the generative AI's responses with user intent, the system enhances the overall user experience. Users are more likely to engage positively when they receive responses that directly address their needs, preferences, and objectives. This alignment leads to increased user satisfaction and a higher likelihood of desired outcomes, such as, for example, making a purchase, booking a service, or taking another meaningful action.

Figure 3:
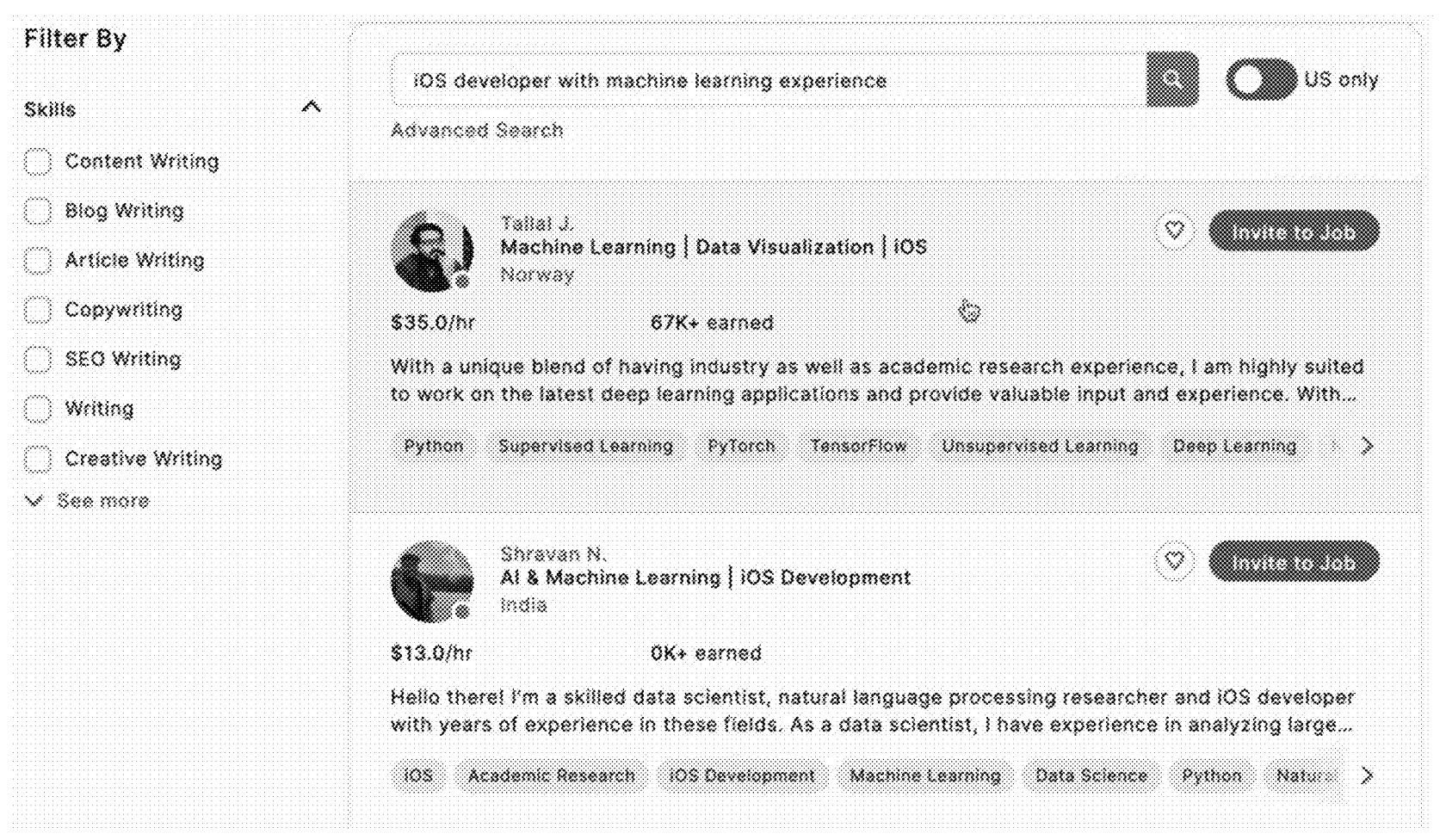

FIG. 3 is a diagram illustrating one example embodiment of providing rich media presentation of recommendations in generative media. This screenshot showcases a user interface (hereinafter "UI") of a recruitment platform, where the UI is used to search for candidates for software contract work of various kinds.

At the top of the screenshot, there is a search engine text field where the user has entered their query: "iOS developer with machine learning experience." This query serves as the basis for generating a list of sorted recommended items, which are displayed below the search field. In the presented search results, the first two recommendations are visible. One recommendation pertains to a developer based in Norway, while the other relates to a developer located in India. Each of these recommendations is accompanied by an array of UI elements designed to provide information to the user. These elements include the developer's location, years of experience, hourly rate, areas of specialization, and more.

However, not all of these UI elements may be relevant or essential to the user's immediate needs, and the user may be overwhelmed or confused by the amount of information presented within a small space. In a subsequent interaction with the system, the user may initiate a conversational session with a chatbot powered by generative AI, readily accessible on the same platform. Within this session, the user explicitly requests that the UI focus solely on elements related to iOS development and machine learning experience.

The generative AI system, utilizing its capabilities, detects the mention of these specific aspects within the recommended items and generates labeled training examples based on these mentions. These examples are then employed to refine the presentation of the media elements associated with the search results. The resulting refined presentation may aim to provide the user with more targeted and pertinent information. In such a refined view, extraneous details, such as earnings or unrelated specializations, may be filtered out. The keyword "iOS" may be highlighted or made more prominent, enabling the user to quickly identify candidates with iOS expertise. Additionally, non-relevant specializations may be replaced with sub-specializations that are directly related to iOS and mobile application development.

Ultimately, the refined presentation, informed by the user's specific preferences and requests, can be presented to the user upon the user mentioning changes and providing feedback on the UI elements being presented for the rich media presentation. This enhanced presentation aligns more closely with the user's intent and requirements, optimizing the user's ability to identify and select candidates for contract work in their desired field.

Figure 4:
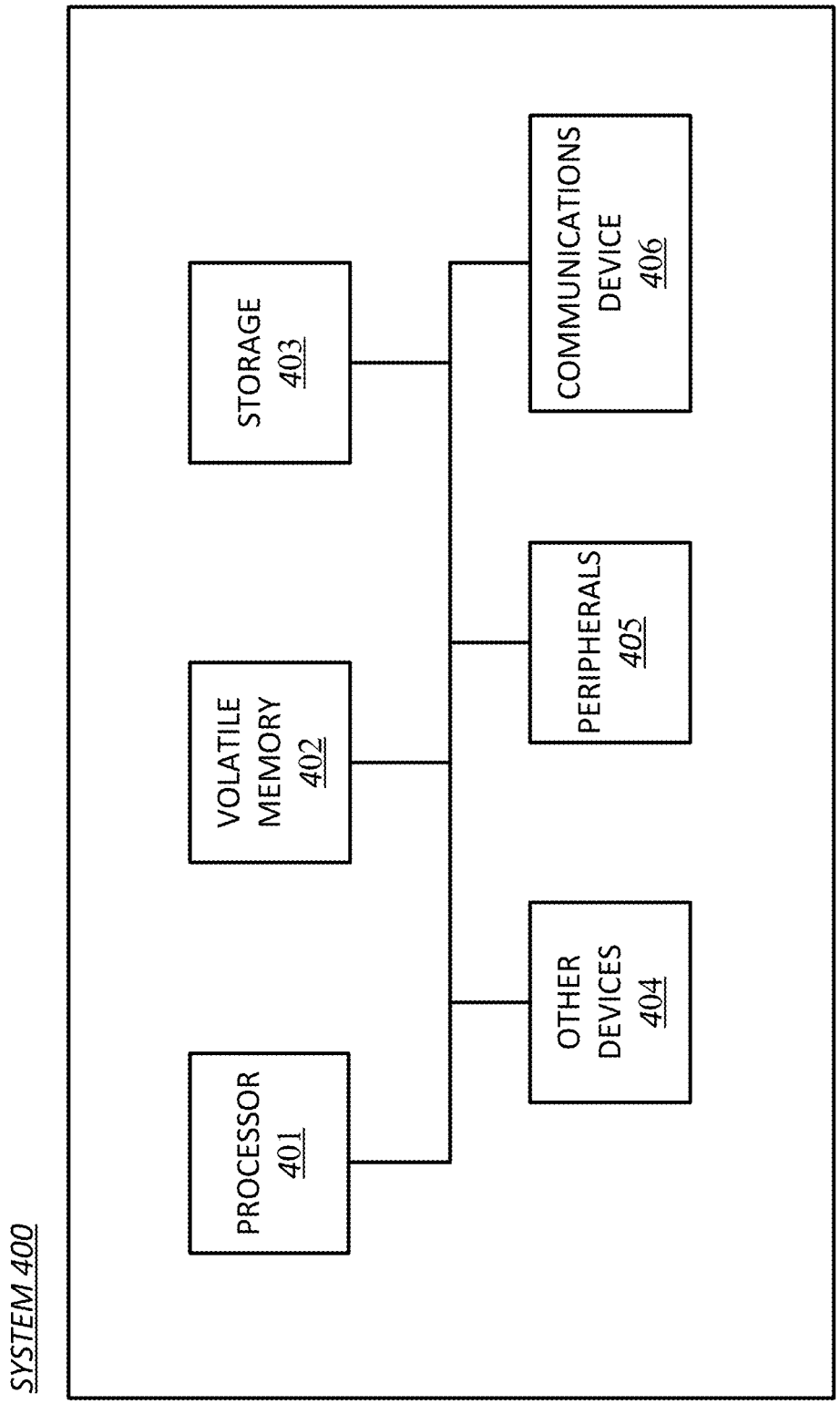
FIG. 4 is a diagram illustrating an exemplary computer that may perform processing in some embodiments.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for dynamically refining a presentation of recommendations to a user, comprising:
   deploying a chatbot via a platform, the platform comprising a processing engine hosted on a computer;
   initiating, by the platform, a communication session between the deployed chatbot and an application operable on a client device;
   receiving, from the application, conversational context associated with a user, the conversational context being in the form of text and/or voice recordings;
   inputting into a generative artificial intelligence (AI) system comprising a large language model, a prompt including the conversational context;
   based on the input conversational context, generating by the platform, via the generative artificial intelligence system, a set of textual and multimedia content comprising a plurality of sorted recommended items, wherein the multimedia content comprises images, audio clips, video or a combination thereof;
   providing to the application operable on the client device the set of textual and multimedia content;
   receiving by the platform, one or more user responses from the application to the text and multimedia content presented via a user interface of the application, the user interface comprising a user interface control to input the conversational context and a display portion that displays textual and multimedia content received by the application from the platform;
   monitoring and quantifying, by the processing engine, the received one or more user responses from the application to the presented textual and multimedia content and one or more associated generative responses from the trained generative AI system;
   based on the monitoring and quantifying, by the processing engine, detecting one or more mentions in the responses to one of the plurality of sorted recommended items;
   generating, by the processing engine, from the one or more detected mentions, one or more labeled training examples;
   further training the trained generative AI system based on the one or more generated labeled training examples to improve the presentation of the multimedia content in future communication sessions;
   generating by the platform, via the further trained generative AI system, another set of multimedia content comprising a plurality of additional sorted recommended items; and
   providing to the application the another set of multimedia content generated by the further trained generative AI system.

2. The method of claim 1, wherein the detection comprises:
   using natural language processing and/or pattern recognition to identify and extract textual mentions from the responses; or
   using speech recognition to transcribe spoken words and detecting reference to recommended items.

3. The method of claim 1, wherein the plurality of sorted recommended items are prioritized based on recommendation magnitude scores.

4. The method of claim 1, further comprising:
   presenting a disclosure to the user that one or more media responses may be influenced by paid promotions to comply with advertising disclosure regulations.

5. The method of claim 1, further comprising:
   assessing the efficiency of the generative AI system's responses based on a quantitative analysis of achieved desirable outcomes.

6. The method of claim 1, further comprising:
   assessing the efficiency of the generative AI system's responses based on user feedback.

7. The method of claim 1, wherein the trained generative AI system is optimized to prioritize presenting media content that is likely to result in desirable outcomes.

8. The method of claim 1, wherein the media content presentation is further refined by factoring in user feedback obtained from user responses.

9. The method of claim 1, further comprising adjusting the presentation of media content based on user interactions within the communication session.

10. A system for dynamically refining a presentation of recommendations to a user, comprising one or more processors configured to perform the operations of:
    deploying a chatbot via a platform, the platform comprising a processing engine hosted on a computer;
    initiating, by the platform, a communication session between the deployed chatbot and an application operable on a client device;
    receiving, from the application, conversational context associated with a user, the conversational context being in the form of text and/or voice recordings;

inputting into a generative artificial intelligence (AI) system comprising a large language model, a prompt including the conversational context;

based on the input conversational context, generating by the platform, via the generative artificial intelligence system, a set of textual and multimedia content comprising a plurality of sorted recommended items, wherein the multimedia content comprises images, audio clips, video or a combination thereof;

providing to the application operable on the client device the set of textual and multimedia content;

receiving by the platform, one or more user responses from the application to the text and multimedia content presented via a user interface of the application, the user interface comprising a user interface control to input the conversational context and a display portion that displays textual and multimedia content received by the application from the platform;

monitoring and quantifying, by the processing engine, the received one or more user responses from the application to the presented textual and multimedia content and one or more associated generative responses from the trained generative AI system;

based on the monitoring and quantifying, by the processing engine, detecting one or more mentions in the responses to one of the plurality of sorted recommended items;

generating, by the processing engine, from the one or more detected mentions, one or more labeled training examples;

further training the trained generative AI system based on the one or more generated labeled training examples to improve the presentation of the multimedia content in future communication sessions;

generating by the platform, via the further trained generative AI system, another set of multimedia content comprising a plurality of additional sorted recommended items; and providing to the application the another set of multimedia content generated by the further trained generative AI system.

11. The system of claim 10, wherein the one or more processors are further configured to perform the operation of:
employing data from both successful and unsuccessful communication sessions to enhance future media content presentation.

12. The system of claim 10, wherein the one or more processors are further configured to perform the operation of:
utilizing an attribution model to attribute user actions to media content mentions.

13. The system of claim 10, wherein the communication session is conducted within an online platform facilitating user interactions and media content presentation.

14. The system of claim 10, wherein the one or more processors are further configured to perform the operation of:
generating, from the detected mentions, user engagement signals for refining the generative AI system.

15. The system of claim 10, wherein the one or more processors are further configured to perform the operation of:
evaluating the effectiveness of generative AI system responses based on inferred user outcomes associated with media content interactions.

16. The system of claim 10, wherein the training of the trained generative AI system includes enhancing the generative AI system's ability to generate responses that align with user intent, thereby optimizing user engagement and desired outcomes.

17. A non-transitory computer-readable medium for dynamically refining a presentation of recommendations to a user, comprising:
instructions for deploying a chatbot via a platform, the platform comprising a processing engine hosted on a computer;

instructions for initiating, by the platform, a communication session between the deployed chatbot and an application operable on a client device;

instructions for receiving, from the application, conversational context associated with a user, the conversational context being in the form of text and/or voice recordings;

instructions for inputting into a generative artificial intelligence (AI) system comprising a large language model, a prompt including the conversational context;

based on the input conversational context, generating by the platform, via the generative artificial intelligence system, a set of textual and multimedia content comprising a plurality of sorted recommended items, wherein the multimedia content comprises images, audio clips, video or a combination thereof;

instructions for providing to the application operable on the client device the set of textual and multimedia content;

instructions for receiving by the platform, one or more user responses from the application to the text and multimedia content presented via a user interface of the application, the user interface comprising a user interface control to input the conversational context and a display portion that displays textual and multimedia content received by the application from the platform;

instructions for monitoring and quantifying, by the processing engine, the received one or more user responses from the application to the presented textual and multimedia content and one or more associated generative responses from the trained generative AI system;

based on the monitoring and quantifying, by the processing engine, instructions for detecting one or more mentions in the responses to one of the plurality of sorted recommended items;

instructions for generating, by the processing engine, from the one or more detected mentions, one or more labeled training examples;

instructions for further training the trained generative AI system based on the one or more generated labeled training examples to improve the presentation of the multimedia content in future communication sessions;

instructions for generating by the platform, via the further trained generative AI system, another set of multimedia content comprising a plurality of additional sorted recommended items; and instructions for providing to the application the another set of multimedia content generated by the further trained generative AI system.

18. The non-transitory computer-readable medium of claim 17, wherein the detection comprises:
using natural language processing and/or pattern recognition to identify and extract textual mentions from the responses; or using speech recognition to transcribe spoken words and detecting reference to recommended items.

19. The non-transitory computer-readable medium of claim 18, wherein the detection comprises:
- instructions for using natural language processing and/or pattern recognition to identify and extract textual mentions from the responses; or
- instructions for using speech recognition to transcribe spoken words and detecting reference to recommended items.

\* \* \* \* \*